(12) United States Patent
Lundberg (10) Patent No.: US 11,125,132 B2
(45) Date of Patent: Sep. 21, 2021

(54) METHOD AND CONTROL SYSTEM FOR CONTROL OF DOSAGE OF A REDUCING AGENT

(71) Applicant: Scania CV AB, Södertälje (SE)

(72) Inventor: Christer Lundberg, Rönninge (SE)

(73) Assignee: Scania CVAB, Södertälje (SE)

( * ) Notice: Subject to any disclaimer, the term of this patent is extended or adjusted under 35 U.S.C. 154(b) by 0 days.

(21) Appl. No.: 17/048,121

(22) PCT Filed: Apr. 18, 2019

(86) PCT No.: PCT/SE2019/050364
§ 371 (c)(1),
(2) Date: Oct. 16, 2020

(87) PCT Pub. No.: WO2019/209161
PCT Pub. Date: Oct. 31, 2019

(65) Prior Publication Data
US 2021/0148265 A1    May 20, 2021

(30) Foreign Application Priority Data

Apr. 24, 2018 (SE) .................................. 1850482-9

(51) Int. Cl.
*F01N 3/20*    (2006.01)
*F01N 11/00*    (2006.01)
*F01N 9/00*    (2006.01)

(52) U.S. Cl.
CPC ............... *F01N 3/206* (2013.01); *F01N 9/00* (2013.01); *F01N 11/00* (2013.01); *F01N 2560/026* (2013.01)

(58) Field of Classification Search
CPC . F01N 3/206; F01N 11/00; F01N 9/00; F01N 2560/026
See application file for complete search history.

(56) References Cited

U.S. PATENT DOCUMENTS

| 2010/0024389 A1 | 2/2010 | Gady et al. |
| 2011/0016849 A1 | 1/2011 | Runde et al. |

(Continued)

FOREIGN PATENT DOCUMENTS

| EP | 2784281 A1 | 10/2014 |
| EP | 2899379 A1 | 7/2015 |

(Continued)

OTHER PUBLICATIONS

Scania CV AB, International Application No. PCT/SE2019/050364, International Preliminary Report on Patentability, dated Oct. 27, 2020.

(Continued)

*Primary Examiner* — Brandon D Lee
(74) *Attorney, Agent, or Firm* — Moore & Van Allen PLLC; W. Kevin Ransom (57) ABSTRACT

Disclosed is a method for control of dosage of a reducing agent into an exhaust stream, which includes: determining at least one sensor signal $S_{NOx}$ from at least one nitrogen oxides $NO_x$ sensor arranged downstream of at least one of the one or more reduction catalysts as at least one sensor correction value $S_{NOx\_corr}$, respectively, if: 1) the engine rotates without fuel supply; 2) an exhaust mass flow $M'_{exh}$ is greater than an exhaust mass flow threshold $M'_{exh\_th}$; $M'^{exh}>M'_{exh\_th}$; and 3) the sensor signal $S_{NOx}$ has had a value smaller than a sensor signal threshold $S_{NOx\_th}$; $S_{NOx}<S_{NOx\_th}$; during at least a predetermined time period $T_{con}$; determining at least one adjusted sensor signal $S_{NOx\_adj}$ based on the at least one sensor signal $S_{NOx}$ and the at least one sensor correction value $S_{NOx\_corr}$, respectively; and controlling the dosage of the reducing agent based on the at least one adjusted sensor signal $S_{NOx\_adj}$.

14 Claims, 4 Drawing Sheets

(56) References Cited

U.S. PATENT DOCUMENTS

| | | | |
|---|---|---|---|
| 2012/0060469 A1 | 3/2012 | Gady et al. | |
| 2012/0255277 A1* | 10/2012 | Rajagopalan | F02D 41/123 |
| | | | 60/274 |
| 2014/0020364 A1 | 1/2014 | Wittrock et al. | |
| 2015/0113956 A1 | 4/2015 | Bauer | |
| 2015/0153244 A1 | 6/2015 | Nienhoff et al. | |

FOREIGN PATENT DOCUMENTS

| | | |
|---|---|---|
| GB | 2518287 A | 3/2015 |
| KR | 20140029589 A | 3/2014 |
| SE | 1450975 A1 | 2/2016 |
| WO | 2016028217 A1 | 2/2016 |

OTHER PUBLICATIONS

Scania CV AB, International Application No. PCT/SE2019/050364, International Search Report, dated Jun. 17, 2019.
Scania CV AB, International Application No. PCT/SE2019/050364, Written Opinion, dated Jun. 17, 2019.

* cited by examiner

METHOD AND CONTROL SYSTEM FOR CONTROL OF DOSAGE OF A REDUCING AGENT

CROSS-REFERENCE TO RELATED APPLICATIONS

This application is a National Stage Application (filed under 35 § U.S.C. 371) of PCT/SE2019/050364, filed Apr. 18, 2019 of the same title, which, in turn claims priority to Swedish Application No. 1850482-9 filed Apr. 24, 2018 of the same title; the contents of each of which are hereby incorporated by reference.

FIELD OF THE INVENTION

The present invention relates to a method control of dosage of a reducing agent into an exhaust stream, according to the preamble of claim 1. The present invention also relates to a system arranged for control of dosage of a reducing agent into an exhaust stream, according to the preamble of claim 15. The invention also relates to a computer program and a computer-readable medium, which implement the method according to the invention.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often comprise requirements defining acceptable limits of exhaust emissions from combustion engines in for example vehicles. For example, emission levels of nitrogen oxides $NO_x$, hydrocarbons HC, carbon monoxide CO and particles PM are often regulated by such standards for most types of vehicles. Vehicles equipped with combustion engines typically produce such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified).

A common way of treating exhausts from a combustion engine includes a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise at least one catalyst, wherein an additive/reducing agent is supplied to the exhaust stream resulting from the combustion in the combustion engine, in order to reduce nitrogen oxides $NO_x$, primarily to nitrogen gas and aqueous vapor.

Selective Catalytic Reduction (SCR) catalysts are for example a commonly used type of catalyst for this type of reduction, primarily for heavy goods vehicles. SCR catalysts usually use ammonia $NH_3$, or a composition from which ammonia may be generated/formed, such as e.g. AdBlue, as an additive/reducing agent to reduce the amount of nitrogen oxides $NO_x$ in the exhausts. The additive/reducing agent is injected into the exhaust stream resulting from the combustion engine upstream of the catalyst. The additive/reducing agent added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive/reducing agent.

SUMMARY OF THE INVENTION

The additive/reducing agent being injected into the exhaust stream is thus very important for the reduction of the nitrogen oxides $NO_x$ in the exhausts. Therefore, a closed loop control of the injection of the additive/reducing agent is conventionally often used. The closed loop control may be based on a sensor signal $S_{NOx}$ provided by a nitrogen oxides $NO_x$ sensor arranged downstream of a reduction catalyst in the system, e.g. arranged in the tailpipe of the exhaust treatment system for measuring the emission of nitrogen oxides $NO_x$. However, in known solutions, the control of the amount of reducing agent to be injected is not very exact/reliable, since the nitrogen oxides $NO_x$ sensor does not provide an accurate value and/or has a sensor error.

When the closed loop control is based on such an inaccurate $NO_x$ value, the control of the injection of the reducing agent may result in a suboptimal performance for the reduction catalysts. Essentially, if too little reducing agent is injected due to the inaccurate/non-optimized closed loop control, the emission of nitrogen oxides $NO_x$ becomes unnecessary high, and might even be deficient/unacceptable such that it exceeds allowed emission standard values/requirements for nitrogen oxides $NO_x$. Alternatively, in order to comply with the emission regulations in spite of the non-optimized injection, the engine control system might be forced to run the engine such that less nitrogen oxides $NO_x$ are produced by the engine. However, the engine runs more fuel efficient if it is allowed to produce more nitrogen oxides $NO_x$, wherefore such an engine control may result in unnecessarily increased fuel consumption.

When the closed loop control is based on inaccurate $NO_x$ values, the control of the injection of the reducing agent may also result in excessive injection of reducing agent into the exhaust stream. If too much reducing agent is injected into the exhaust stream, there is a risk that residues/precipitates/crystallizations (hereafter commonly denoted residues and/or deposits) of additive/reducing agent are formed downstream of the dosage device injecting the additive/reducing agent into the exhaust stream e.g. in an evaporation chamber. Such reducing agent residues of reducing agent being formed in the exhaust treatment system potentially increase the back pressure in the exhaust treatment system, and therefore potentially also increase the fuel consumption for the engine. Also, such additive/reducing agent residues in the exhaust treatment system may have a negative effect on the general purification performance of the exhaust treatment system, since the additive/reducing agent residues in the evaporation chamber reduces the evaporation efficiency, which may result in that too little evaporated reducing agent reaches the SCR catalyst.

The increased back pressure and/or the less efficient exhaust purification of the exhaust treatment system may also result in a number of control system related problems. The one or more control systems arranged for controlling the exhaust treatment system may be unaware of these problems, and may thus keep on controlling the system based on the assumption that the back pressure is not increased and/or that an efficient reduction of nitrogen oxides $NO_x$ is effected by the system.

It is therefore important to base the closed loop control on accurate $NO_x$ values, such that the control of the dosage of the reducing agent is optimized for purification of the exhaust stream passing through the exhaust treatment system.

An object of the present invention is to at least partly solve at least some of the above mentioned problems/disadvantages.

The object is achieved through the above mentioned method for control of dosage of a reducing agent into an exhaust stream from an engine, the reducing agent being used for reduction of nitrogen oxides $NO_x$ in one or more reduction catalysts of an exhaust treatment system arranged for treating the exhaust stream. The method includes:

determining at least one sensor signal $S_{NOx}$ from at least one nitrogen oxides $NO_x$ sensor arranged downstream of at least one of the one or more reduction catalysts as at least one sensor correction value $S_{NOx\_corr}$, respectively, if:
the engine revolves without fuel supply;
an exhaust mass flow $M'_{exh}$ is greater than an exhaust mass flow threshold $M'_{exh\_th}$; $M'_{exh}>M'_{exh\_th}$; and
the at least one sensor signal $S_{NOx}$ has had a value smaller than a sensor signal threshold $S_{NOx\_th}$; $S_{NOx}<S_{NOx\_th}$; during at least a predetermined time period $T_{con}$;

determining at least one adjusted sensor signal $S_{NOx\_adj}$ based on the at least one sensor signal $S_{NOx}$ and the at least one sensor correction value $S_{NOx\_corr}$, respectively; and controlling the dosage of the reducing agent based on the at least one adjusted sensor signal $S_{NOx\_adj}$.

Thus, at least one sensor correction value $S_{NOx\_corr}$ is determined/detected when it is assumed that the exhaust stream should be essentially free from nitrogen oxides $NO_x$ produced by the engine. This means that at least one sensor signal $S_{NOx}$ from at least one nitrogen oxides $NO_x$ sensor is determined when the exhaust stream is assumed to be essentially free from nitrogen oxides $NO_x$. This determined at least one sensor signal value may then be used as at least one sensor correction value $S_{NOx\_corr}$, respectively. The at least one sensor correction value $S_{NOx\_corr}$ may therefore be stored and/or be used for determining the at least one adjusted sensor signal $S_{NOx\_adj}$, for example by subtracting the at least one sensor correction value $S_{NOx\_corr}$ from the at least one sensor signal $S_{NOx}$, respectively. The at least one adjusted sensor signal $S_{NOx\_adj}$ is then used in the reducing agent dosage control.

Hereby, a continuous closed loop control of the emitted nitrogen oxides $NO_x$, including e.g. a closed loop control of the injection of reducing agent, may be provided, since the offset error of the at least one nitrogen oxides $NO_x$ sensor is reduced, especially for a vehicle/system complying with the emission requirements of the Euro VI emission standards. To reduce the sensor offset error is important for vehicle/system complying with the emission requirements of the Euro VI emission standards, since the nitrogen oxides $NO_x$ level downstream of the at least one reduction catalyst is relatively low, in the region of the accuracy of the at least one nitrogen oxides $NO_x$ sensor. As a non-limiting example, the accuracy of the at least one nitrogen oxides $NO_x$ sensor may be approximately ±100 mg/kWh, and the nitrogen oxides $NO_x$ emission target value may be 200 mg/kWh. However, the sensor accuracy of ±100 mg/kWh includes the sensor offset error, which, according to the present invention, is compensated for in the determined at least one adjusted sensor signal $S_{NOx\_adj}$, which is then used for the reducing agent dosage control. Hereby, a reliable and exact closed loop control of the injection of reducing agent may be provided when the present invention is used.

For vehicle/system complying with some other emission standards, such as e.g. the requirements of the Euro IV or Euro V emission standards, the nitrogen oxides $NO_x$ level downstream of the at least one reduction catalyst is much higher than for a vehicle/system complying with the Euro VI standard. Thus, the nitrogen oxides $NO_x$ level is normally well within the at least one nitrogen oxides $NO_x$ sensor measurement range. However, the control of the reducing agent injection, and therefore also of the reduction of nitrogen oxides $NO_x$, are here degraded by the cross-sensitivity of the at least one nitrogen oxides $NO_x$ sensor. For example, for an exhaust treatment system including one or more degraded/worn reduction catalysts, the reducing agent slip may be significant, and an ammonia level downstream of the at least one reduction catalyst may even reach levels corresponding to the nitrogen oxides $NO_x$ levels. If this ammonia is sensed as nitrogen oxides $NO_x$ due to the cross-sensitivity of the sensor, the control of the reducing agent dosage is based on incorrect assumptions of the downstream nitrogen oxides $NO_x$ levels, which results in an inefficient reduction performance for the at least one reduction catalyst. However, when the present invention is implemented in a vehicle/system complying to e.g. the Euro IV or Euro V emission standards, the impact of the reducing agent slip due to cross-sensitivity of the at least one nitrogen oxides $NO_x$ sensor is reduced, since a part of the ammonia slip contribution to the at least one sensor signal $S_{NOx}$ provided by the at least one cross-sensitive sensor is included in the determined at least one sensor correction value $S_{NOx\_corr}$, which may be subtracted from the at least one sensor signal $S_{NOx}$, respectively, when determining the at least one adjusted sensor signal $S_{NOx\_adj}$. The at least one adjusted sensor signal $S_{NOx\_adj}$ is then used in the reduction agent dosage control, which enables an efficient reduction of nitrogen oxides $NO_x$.

Thus, the amount of reducing agent to be injected into the exhaust stream may, by use of the present invention, be precisely controlled, such that the reduction of nitrogen oxides $NO_x$ is optimized, i.e. is made more efficient. This is possible, since the amount of reducing agent to be injected may safely be increased in some situations, due to the fact that the adjusted sensor signal $S_{NOx\_adj}$ used as a basis for the control of the dosage can be trusted to reflect a correct value for the nitrogen oxides $NO_x$ downstream of the at least one reduction catalyst. By the increased injection, the efficiency of the reduction of the nitrogen oxides $NO_x$ in the one or more reduction catalyst devices using reducing agents for their reduction may be considerably increased.

Thus, the stability of the control of the reducing agent dosage is improved by usage of the present invention, also when the function of the at least one reduction catalyst is deteriorated, e.g. due to time dependent deterioration. It is hereby possible to operate the at least one reduction catalyst closer to its performance limit, without risk of exceeding the allowed emission limits for nitrogen oxides $NO_x$. This is advantageous in many implementations, e.g. for an implementation in a vehicle/system complying to a Euro V emission regulation.

The improved nitrogen oxides $NO_x$ value accuracy resulting from using the adjusted sensor signal $S_{NOx\_adj}$ also makes it possible to reduce the margins necessary for making a closed loop reducing agent dosage control stable and robust. Thus, by removing the sensor offset error by correcting the at least one adjusted sensor signal $S_{NOx\_adj}$ for the at least one sensor correction value $S_{NOx\_corr}$, an exact and reliable closed loop reducing agent dosage control is provided by the present invention. This is advantageous in many implementations, e.g. for an implementation in a vehicle/system complying to a Euro VI emission regulation. It should be noted, that such a closed loop dosage control would in some systems not be feasible if the control would be based on a tailpipe nitrogen oxides $NO_x$ including an offset error, since the margin requirements needed for making the closed control loop stable would then also make the closed control loop very inefficient, i.e. would not result in an efficient dosage control.

An exhaust treatment system implementing the present invention therefore has potential to meet the emission requirements in the Euro IV, Euro V and Euro VI emission standards. Additionally, the exhaust treatment system according to the present invention has potential to meet the emission requirements in several other existing and/or future emission standards. The invention may also be generally used for improving the control of a dosage device, resulting in e.g. improved fuel efficiency and/or reduced fuel consumption.

As mentioned above, if some situations, a larger dosage amount (a more ample dosage) may be allowed to be injected by the reducing agent dosage device when the present invention is used, than would have been allowed for known solutions. This is possible since the control according to the present invention is much more accurate and reliable than the control of the known methods. The present invention therefore for example makes it possible to, in some situations, in a controlled fashion inject more reducing agent, i.e. to inject reducing agent more aggressively, into the exhaust stream than was possible in known methods, whereby a more efficient reduction of nitrogen oxides $NO_x$ is possible for the exhaust treatment system. The present invention therefore also makes it possible to, in some situations, run the engine more fuel efficient than was possible to safely do when the known methods were used.

Through the use of the present invention, a better fuel consumption optimization may be obtained for the vehicle, since there is potential to control the engine in a more fuel efficient manner, due to a possibly more efficient reduction of nitrogen oxides $NO_x$. Thus, a higher output of nitrogen oxides $NO_x$ from the engine may be allowed, since nitrogen oxides $NO_x$ may be efficiently reduced by the exhaust treatment system, whereby a higher fuel efficiency for the engine may be obtained.

According to an embodiment of the present invention, the determination of at least one sensor signal $S_{NOx}$ includes averaging of the at least one sensor signal $S_{NOx}$.

The averaging increases the robustness and reduces the complexity of the method, since the influences of noise and/or fluctuating values included in the at least one sensor signal $S_{NOx}$ are reduced.

According to an embodiment of the present invention, the averaging comprises one or more in the group of:
  low pass filtering of the at least one sensor signal $S_{NOx}$;
  calculation of at least one mean value for the at least one sensor signal $S_{NOx}$;
  calculation of at least one moving average value for the at least one sensor signal $S_{NOx}$; and
  calculation of at least one median value for the at least one sensor signal $S_{NOx}$.

Generally, different averaging methods are suitable for different implementations.

According to an embodiment of the present invention, the averaging is performed using a lowpass filter, the lowpass filter having a time constant $\tau$ related to at least one emission test cycle, the time constant $\tau$ having a value in the range of one in the group of:
  3-7 seconds;
  5 seconds;
  15-25 seconds; and
  20 seconds.

A longer/bigger value for the weight in/time constant T may here ensure that the slowly varying sensor offset value of the nitrogen oxides $NO_x$ sensor is captured in the at least one sensor signal $S_{NOx}$. Correspondingly, a smaller/shorter value for the weight in/time constant T may facilitate improved nitrogen oxides $NO_x$ accuracy already within a test cycle being run.

According to an embodiment of the present invention, the predetermined time period $T_{con}$ has a value making it possible to capture a slip of reducing agent from the at least one reduction catalyst.

Hereby, a slip of reducing agent is included in the at least one sensor signal $S_{NOx}$, i.e. is sensed by the at least one nitrogen oxides $NO_x$ sensor, which improves the accuracy of systems having reducing agent slips.

According to an embodiment of the present invention, the predetermined time period $T_{con}$ has a value in the range of 2-5 seconds, or 3 seconds.

According to an embodiment of the present invention, the predetermined time period $T_{con}$ has a value related to lengths of one or more periods when the engine revolves without fuel supply during normal operation of the vehicle and/or during at least one emission test cycle.

Hereby, the predetermined time period $T_{con}$ may be set such that the engine has revolved without fuel supply for such a long time that the at least one nitrogen oxides $NO_x$ sensor is essentially free from nitrogen oxides $NO_x$, i.e. the predetermined time period $T_{con}$ may be set in relation to a fall time of the at least one nitrogen oxides $NO_x$ sensor. This ensures that the at least one sensor signal $S_{NOx}$ only includes/indicates the offset error for the at least one nitrogen oxides $NO_x$ sensor, respectively. In this document, the normal operation includes usage of the vehicle for its intended use under regular conditions, e.g. driving the vehicle on streets/roads, possibly including other vehicles. The normal operation of the vehicle is then a result of the conditions that are met by the vehicle during its usage. Thus, the normal operation may be a result of fixed and/or random/arbitrary conditions influencing the vehicle when used. There are a number of well-defined emission test cycles that are known by a skilled person.

According to an embodiment of the present invention, the predetermined time period $T_{con}$ has a value in the range of 5-15 seconds, 7-12 seconds, or 10 seconds.

According to an embodiment of the present invention, the mass flow threshold $M'_{exh\_th}$ has a value high enough to ensure one or more in the group of:
  a flow of the exhaust stream through the exhaust treatment system; and a flow of the exhaust stream around the at least one nitrogen oxides $NO_x$ sensor.

Hereby, an accurate determination of the at least one sensor correction value $S_{NOx\_corr}$ is provided.

According to an embodiment of the present invention, the sensor signal threshold $S_{NOx\_th}$ has a value related to one or more in the group of:
- an accuracy of the at least one nitrogen oxides $NO_x$ sensor;
- an offset error for the at least one nitrogen oxides $NO_x$ sensor; and
- a robustness of the control of the dosage of the reducing agent.

Hereby, an accurate and robust determination of the at least one sensor correction value $S_{NOx\_corr}$ is provided.

According to an embodiment of the present invention, the sensor signal threshold $S_{NOx\_th}$ has a value corresponding to a nitrogen oxides $NO_x$ concentration in the range of 15-30 ppm nitrogen oxides $NO_x$, or 20 ppm nitrogen oxides $NO_x$.

According to an embodiment of the present invention, the sensor signal threshold $S_{NOx\_th}$ has a value related to a cross-sensitivity for ammonia of the at least one nitrogen oxides $NO_x$ sensor.

Hereby, an accurate and robust determination of the at least one sensor correction value $S_{NOx\_corr}$ is provided also for cross-sensitive nitrogen oxides $NO_x$ sensors.

The object is also achieved through the above mentioned computer program and computer-readable medium.

The object is achieved also through the above-mentioned system arranged for control of dosage of a reducing agent into an exhaust stream from an engine, the reducing agent being used for reduction of nitrogen oxides $NO_x$ in one or more reduction catalysts of an exhaust treatment system arranged for treating the exhaust stream, in accordance with the characterising portion of claim 15, including:
- means arranged for determining at least one sensor signal $S_{NOx}$ from at least one nitrogen oxides $NO_x$ sensor arranged downstream of at least one of the one or more reduction catalysts as at least one sensor correction value $S_{NOx\_corr}$, respectively, if:
  - the engine revolves without fuel supply;
  - an exhaust mass flow $M'_{exh}$ is greater than an exhaust mass flow threshold $M'_{exh\_th}$; $M'_{exh} > M'_{exh\_th}$; and
  - the at least one sensor signal $S_{NOx}$ has had a value smaller than a sensor signal threshold $S_{NOx\_th}$; $S_{NOx} < S_{NOx\_th}$; during at least a predetermined time period $T_{con}$;
- means arranged for determining at least one adjusted sensor signal $S_{NOx\_adj}$ based on the at least one sensor signal $S_{NOx}$ and the at least one sensor correction value $S_{NOx\_corr}$, respectively; and
- means arranged for controlling the dosage of the reducing agent based on the at least one adjusted sensor signal $S_{NOx\_adj}$.

According to an embodiment of the present invention, the determining means is arranged for determination of the at least one sensor signal $S_{NOx}$ including averaging of the at least one sensor signal $S_{NOx}$.

According to an embodiment of the present invention, the determining means is arranged for in the averaging including one or more in the group of:
- low pass filtering of the at least one sensor signal $S_{NOx}$;
- calculation of at least one mean value for the at least one sensor signal $S_{NOx}$;
- calculation of at least one moving average value for the at least one sensor signal $S_{NOx}$; and
- calculation of at least one median value for the at least one sensor signal $S_{NOx}$.

According to an embodiment of the present invention, the determining means is arranged for performing the averaging by using a lowpass filter, the lowpass filter having a time constant $\tau$ related to at least one emission test cycle, the time constant $\tau$ having a value in the range of one in the group of:
- 3-7 seconds;
- 5 seconds;
- 15-25 seconds; and
- 20 seconds.

According to an embodiment of the present invention, the determining means is arranged for setting the predetermined time period $T_{con}$ to a value making it possible to capture a slip of reducing agent from the at least one reduction catalyst.

According to an embodiment of the present invention, the determining means is arranged for setting the predetermined time period $T_{con}$ to a value in the range of 2-5 seconds, or 3 seconds.

According to an embodiment of the present invention, the determining means is arranged for setting the predetermined time period $T_{con}$ to value related to lengths of one or more periods when the engine revolves without fuel supply during normal operation of the vehicle and/or during at least one emission test cycle.

According to an embodiment of the present invention, the determining means is arranged for setting the predetermined time period $T_{con}$ has a value in the range of 5-15 seconds, 7-12 seconds, or 10 seconds.

According to an embodiment of the present invention, the determining means is arranged for setting the mass flow threshold $M'_{exh\_th}$ has a value high enough to ensure one or more in the group of:
- a flow of the exhaust stream through the exhaust treatment system; and
- a flow of the exhaust stream around the at least one nitrogen oxides $NO_x$ sensor.

According to an embodiment of the present invention, the determining means is arranged for setting the sensor signal threshold $S_{NOx\_th}$ to a value related to one or more in the group of:
- an accuracy of the at least one nitrogen oxides $NO_x$ sensor;
- an offset error for the at least one nitrogen oxides $NO_x$ sensor; and
- a robustness of the control of the dosage of the reducing agent.

According to an embodiment of the present invention, the determining means is arranged for setting the sensor signal threshold $S_{NOx\_th}$ to a value corresponding to a nitrogen oxides $NO_x$ concentration in the range of 15-30 ppm nitrogen oxides $NO_x$, or 20 ppm nitrogen oxides $NO_x$.

According to an embodiment of the present invention, the determining means is arranged for setting the sensor signal threshold $S_{NOx\_th}$ to a value related to a cross-sensitivity for ammonia of the at least one nitrogen oxides $NO_x$ sensor.

The systems and system embodiments herein described have the same advantages as their corresponding methods and method embodiments.

BRIEF DESCRIPTION OF THE DRAWINGS

The embodiments of the present invention will be illustrated in more detail below, along with the enclosed drawings, where similar references are used for similar parts, and where.

DETAILED DESCRIPTION OF THE INVENTION

Figure 1:
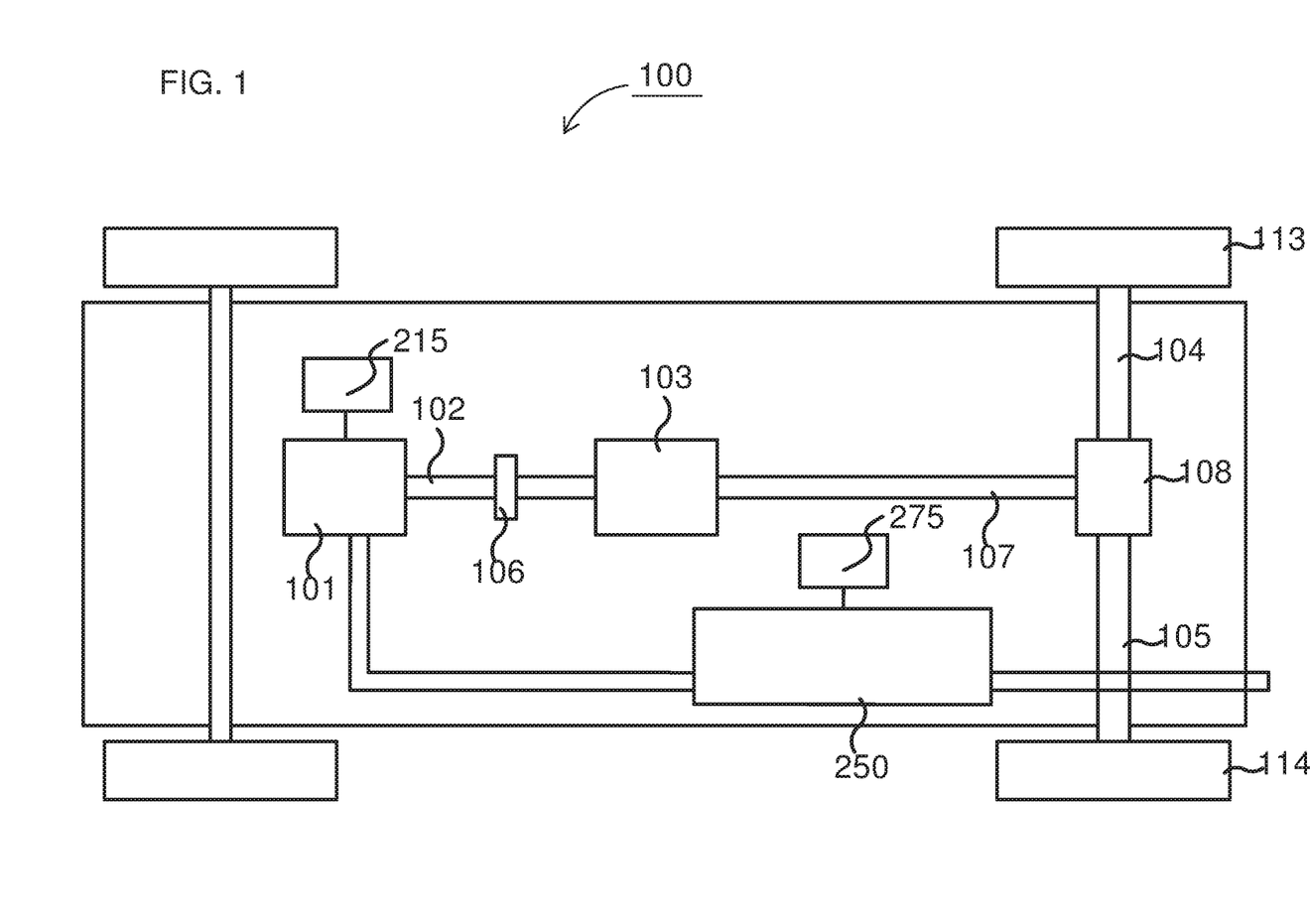
FIG. 1 schematically shows an example vehicle, in which the embodiments of the present invention may be implemented, FIG. 2 schematically shows a traditional exhaust treatment system, in which the embodiments of the present invention may be implemented, FIG. 3 schematically shows some parts of a reducing agent dosage system, in which the embodiments of the present invention may be implemented.

FIG. 1 schematically shows an example vehicle 100 comprising an exhaust treatment system 250. The powertrain comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 215. Likewise, the clutch 106 and the gearbox 103 may be controlled by the vehicle's control system, with the help of one or more applicable control devices (not shown). Naturally, the vehicle's powertrain may also be of another type, such as a type with a conventional automatic gearbox, of a type with a hybrid powertrain, etc. A Hybrid powertrain may include the combustion engine and at least one electrical motor, such that the power/torque provided to the clutch/gearbox may be provided by the combustion engine and/or the electric motor.

An output shaft 107 from the gearbox 103 drives the wheels 113, 114 via a final drive 108, such as e.g. a customary differential, and the drive shafts 104, 105 connected to the final drive 108.

The vehicle 100 also comprises an exhaust treatment system/exhaust purification system 250 for treatment/purification of exhaust emissions resulting from combustion in the combustion chamber(s) of the combustion engine 101, which may comprise cylinders. The exhaust treatment system 250 may be controlled by a control unit 275.

Figure 2:
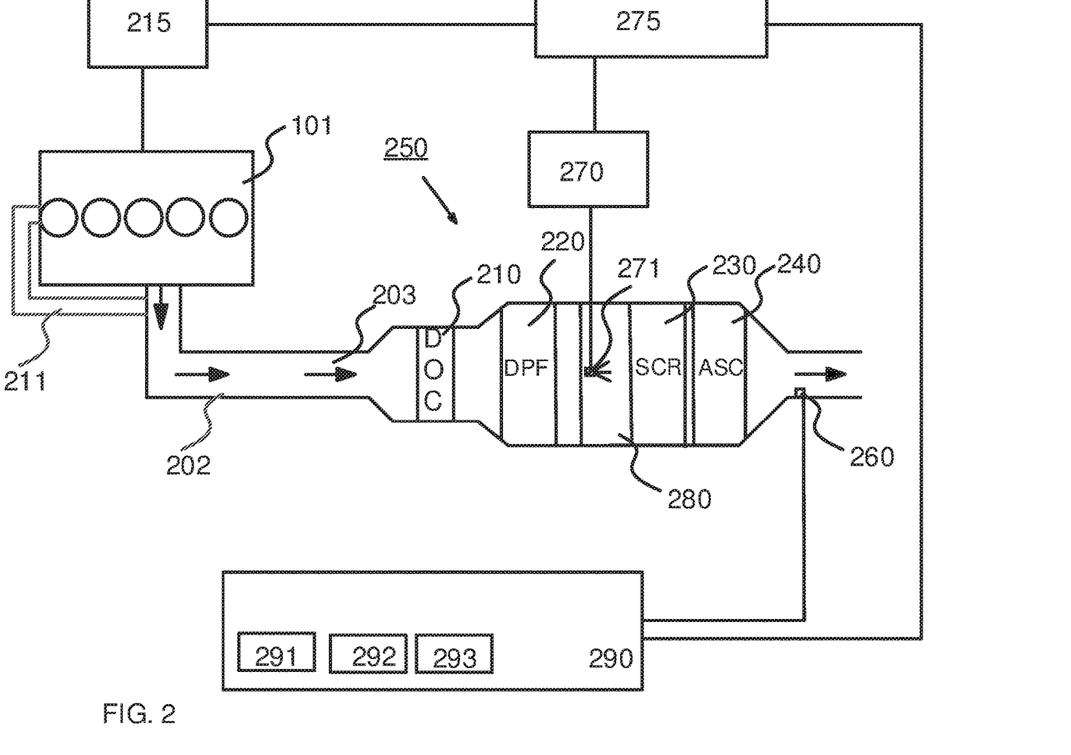

FIG. 2 schematically shows an example exhaust treatment system 250, in which embodiments of the present invention may be implemented. The system 250 may illustrate a system fulfilling the above mentioned Euro VI standard, and which is connected to a combustion engine 101 via an exhaust conduit 202, wherein the exhausts generated at combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter 220 is used to catch these soot particles. The exhaust stream 203 is here led through a filter structure, wherein soot particles from the exhaust stream 203 are caught passing through, and are stored in the particulate filter 220.

The oxidation catalyst DOC 210 has several functions and is normally used primarily to oxidize, during the exhaust treatment, remaining hydrocarbons $C_xH_y$ (also referred to as HC) and carbon monoxide CO in the exhaust stream 203 into carbon dioxide $CO_2$ and water $H_2O$. The oxidation catalyst DOC 210 may also oxidize a large fraction of the nitrogen monoxides NO occurring in the exhaust stream into nitrogen dioxide $NO_2$. The oxidation of nitrogen monoxide NO into nitrogen dioxide $NO_2$ is important for the nitrogen dioxide based soot oxidation in the filter, and is also advantageous at a potential subsequent reduction of nitrogen oxides $NO_x$. In this respect, the exhaust treatment system 250 further comprises a reduction catalyst device 230, possibly including an SCR (Selective Catalytic Reduction) catalyst, downstream of the particulate filter DPF 220. SCR catalysts use ammonia $NH_3$, or a composition from which ammonia may be generated/formed, e.g. urea, as a reducing agent for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC. This applies up to a value representing approximately 50% of the molar ratio $NO_2/NO_x$.

As mentioned above, the reduction catalyst device 230, including e.g. the SCR-catalyst, requires reducing agent to reduce the concentration of a compound, such as for example nitrogen oxides $NO_x$, in the exhaust stream 203. Such reducing agent is injected into the exhaust stream upstream of the reduction catalyst device 230 by a dosage device 271 being provided with reducing agent by a reducing agent providing system 270. Such reducing agent often comprises ammonia and/or is urea based, or comprises a substance from which ammonia may be extracted or released, and may for example comprise AdBlue, which basically comprises urea mixed with water. Urea forms ammonia at heating (thermolysis) and at heterogeneous catalysis on an oxidizing surface (hydrolysis), which surface may, for example, comprise titanium dioxide $TiO_2$, within the SCR-catalyst. The reducing agent may be evaporated in an evaporation chamber 280. The exhaust treatment system may also comprise a separate hydrolysis catalyst.

The exhaust treatment system 250 may also be equipped with an ammonia slip-catalyst (ASC) 240, which is arranged to oxidize a surplus of ammonia that may remain after the reduction catalyst device 230. Accordingly, the ammonia slip-catalyst ASC may provide a potential for improving the system's total conversion/reduction of $NO_x$.

The exhaust treatment system 250 may also be equipped with one or several sensors, such as one or several $NO_x$—, temperature and/or mass flow sensors, for example arranged in the tailpipe 264 downstream of the components 210, 220, 230, 240 or arranged upstream, within and/or between these components 210, 220, 230, 240, for the determination of measured values for nitrogen oxides, temperatures and/or mass flow in the exhaust treatment system.

A control device/system/means 290 may be arranged/configured for performing some embodiments of the present invention. The control device/system/means 290 is in FIG. 2 illustrated as including separately illustrated units 291, 292, 293 arranged for performing the present invention, as is described below.

Also, as described herein, an engine control device/system/means 215 may be arranged for controlling the engine 201, a system/means 290 may be arranged for controlling the reducing agent providing system 270 and/or the dosage device 271, possibly via an exhaust treatment system control unit/means 275, and to send control signals to the engine control device/system/means 215, and a control device/means 500 may be implemented for performing embodiments of the invention. These means/units/devices systems 290, 291, 292, 293, 215, 270, 275, 500 may, however be at least to some extent logically separated but physically implemented in at least two different physical units/devices. These means/units/devices 290, 291, 292, 293, 215, 270, 275, 500 may also be at least to some extent logically separated and implemented in at least two different physical means/units/devices. Further, these means/units/devices 290, 291, 292, 293, 215, 270, 275, 500 may be both logically and physically arranged together, i.e. be part of a single logic unit which is implemented in a single physical means/unit/device. These means/units/devices 290, 291, 292, 293, 215, 270, 275, 500 may for example correspond to groups of instructions, which may be in the form of programming code, that are input into, and are utilized by at least one processor when the units/means/devices are active and/or are utilized for performing its method step, respectively. It should be noted that the system/means 290 may be implemented at least partly within the vehicle 100 and/or at least partly outside of the vehicle 100, e.g. in a server, computer, processor or the like located separately from the vehicle 100.

As mentioned above, the units 291, 292, 293, described above correspond to the claimed means 291, 292, 293 arranged for performing the embodiments of the present invention, and the present invention as such.

Figure 3:
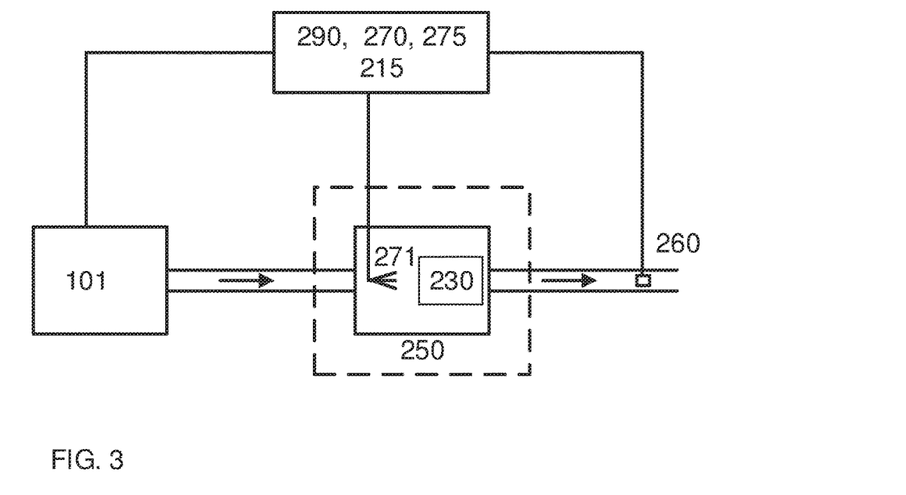

FIG. 3 schematically illustrate some components/parts being used for the above described closed loop control of the injection of the additive/reducing agent. As mentioned above, the closed loop control is often based on a sensor signal $S_{NOx}$ provided by a nitrogen oxides $NO_x$ sensor 260 arranged downstream of one or more reduction catalysts 230 in the system. The nitrogen oxides $NO_x$ sensor 260 may for example be arranged in the tailpipe. The sensor signal $S_{NOx}$ is then used by one or more above described control units/systems 290, 270, 215 in order to regulate the engine 101 and/or the injection of reducing agent by the dosage device 271 upstream of the one or more reduction catalysts 230, respectively, of the exhaust treatment system 250. FIG. 3 is for pedagogical reasons simplified, and only shows the components and/or parts needed for explaining the closed loop control.

Figure 4:
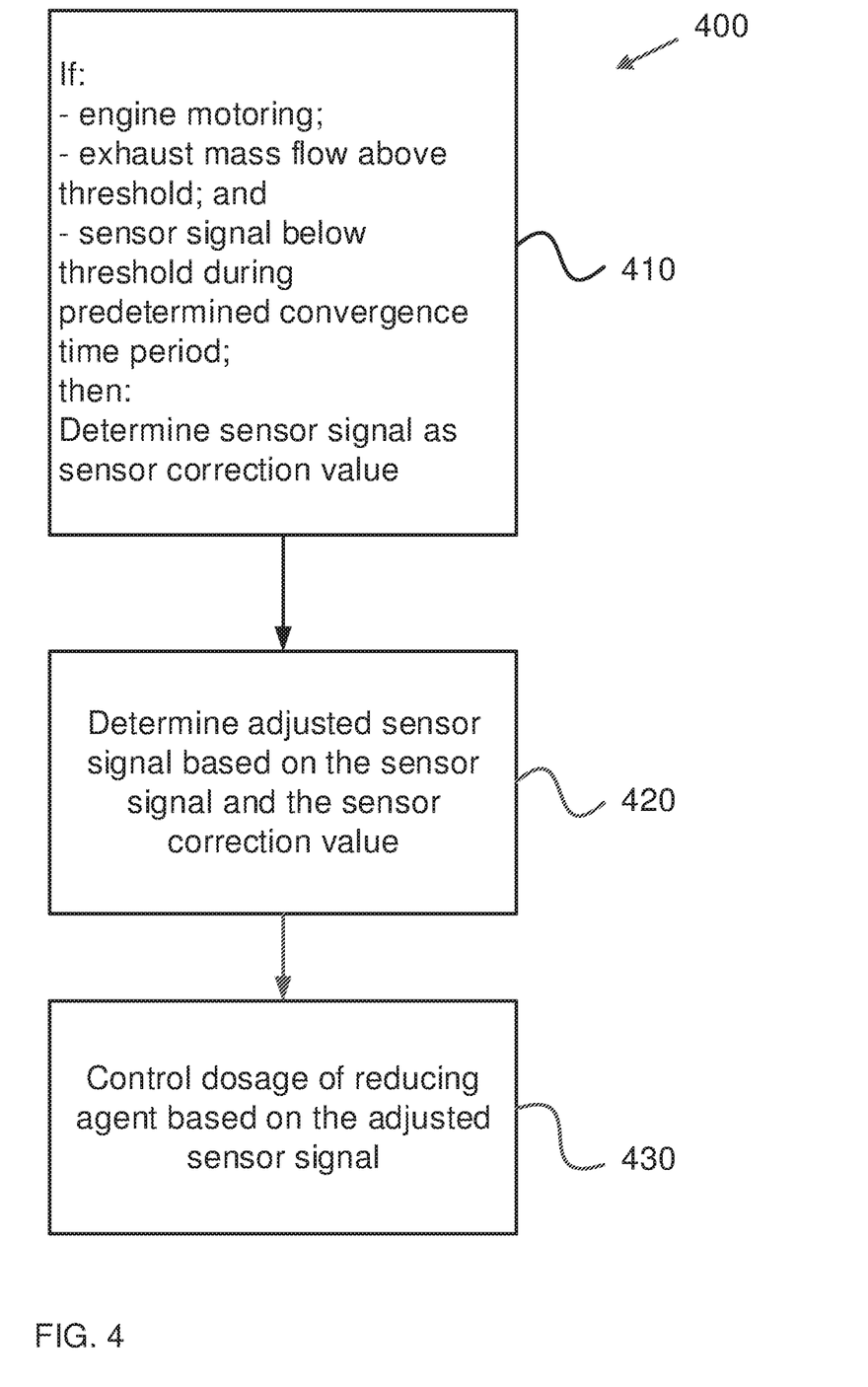
FIG. 4 shows a flow chart for a method according to an embodiment of the present invention.

FIG. 4 shows a flow chart diagram illustrating a method 400 according to an embodiment of the present invention.

The method 400 controls a dosage of a reducing agent into an exhaust stream 203 from an engine 101. The reducing agent is used for reduction of nitrogen oxides $NO_x$ in one or more reduction catalysts 230 of an exhaust treatment system 250 arranged for treating the exhaust stream 203. As explained above, the engine 101 produces an exhaust stream 203 being treated by the exhaust treatment system 250 by use of at least one reducing agent being injected into the exhaust stream 203 by the dosage device 271. The reducing agent may for example be injected into an evaporation chamber 280 when being injected into the exhaust stream 203, and the reducing agent is then there evaporated. Hereby, the reducing agent is provided to the reduction catalyst device 230 in gaseous form downstream of the dosage device 271 and evaporation chamber 280, which makes the function of the reduction catalyst device 230 efficient.

In a first step 410 of the method, at least one sensor signal $S_{NOx}$ produced by at least one nitrogen oxides $NO_x$ sensor 260 arranged downstream of at least one of the one or more reduction catalysts 230 is determined as at least one sensor correction value $S_{NOx\_corr}$, respectively. However, the determination 410 is only performed if at least three conditions are fulfilled. These conditions include that:

the engine 101 should revolve without fuel supply, i.e. a movement of the vehicle is caused by a kinetic energy of the vehicle without torque being transferred from the engine 101 to the at least one drive wheel, e.g. in connection with engine motoring/dragging;

an exhaust mass flow $M'_{exh}$ for the exhaust stream 203 is greater than an exhaust mass flow threshold $M'_{exh\_th}$; $M'_{exh} > M'_{exh\_th}$; and the at least one sensor signal $S_{NOx}$ has had a value smaller than a sensor signal threshold $S_{NOx\_th}$; $S_{NOx} < S_{NOx\_th}$; during at least a predetermined time period $T_{con}$, which in document often is denoted convergence time period $T_{con}$.

Thus, if these conditions are fulfilled, the at least one sensor signal $S_{NOx}$ is determined 410 as at least one sensor correction value $S_{NOx\_corr}$, respectively.

In a second step 420, at least one adjusted sensor signal $S_{NOx\_adj}$ is determined/provided based on the at least one sensor signal $S_{NOx}$ and the at least one sensor correction value $S_{NOx\_corr}$ respectively. According to an embodiment of the present invention, the at least one adjusted sensor signal $S_{NOx\_adj}$ is determined/provided by subtracting the at least one sensor correction value $S_{NOx\_corr}$ from the at least one sensor signal $S_{NOx}$, respectively.

In a third step 430, the determined/provided at least one adjusted sensor signal $S_{NOx\_adj}$ is used as a basis for controlling the dosage of the reducing.

Since the at least one sensor correction value $S_{NOx\_corr}$ is determined when these conditions are fulfilled, it is known that the contribution of the at least one sensor signal $S_{NOx}$ resulting from nitrogen oxides $NO_x$ actually being created by the combustion in the engine should be essentially zero. Thus, the value of the at least one sensor signal $S_{NOx}$ is then a product of something else than the nitrogen oxides $NO_x$ produced by the combustion, i.e. differs from the "true" $NO_x$. Therefore, since the at least one adjusted sensor signal $S_{NOx\_adj}$ is provided/determined based on the at least one sensor signal $S_{NOx}$ and the at least one sensor correction value $S_{NOx\_corr}$, respectively, i.e. since the at least one adjusted sensor signal $S_{NOx\_adj}$ is corrected by the at least one sensor correction value $S_{NOx\_corr}$, respectively, the at least one adjusted sensor signal $S_{NOx\_adj}$ provides for an accurate indication of the nitrogen oxides $NO_x$ created by the combustion. Thus, according to the herein described embodiments of the present invention, the sensor offset error is compensated for in the determined/provided at least one adjusted sensor signal $S_{NOx\_adj}$, which is then used for the reducing agent dosage control. Also, the embodiments of the present invention reduce the impact of the reducing agent slip due to cross-sensitivity of the at least one nitrogen oxides $NO_x$.

Therefore, when the at least one adjusted sensor signal $S_{NOx\_adj}$ is used as a basis for controlling the dosage of the reducing agent, an exact and accurate injection of reducing agent into the exhaust stream 203 is provided. Hereby, an efficient reduction of nitrogen oxides $NO_x$ may be achieved by the one or more reduction catalysts 230.

The efficient reduction of nitrogen oxides $NO_x$ makes it possible for the exhaust treatment system to comply with emission regulations and/or makes it possible to reduce the fuel consumption for the engine. The fuel consumption may be reduced by running the engine more efficiently if the engine is allowed to emit more nitrogen oxides $NO_x$, due to a more efficient reduction of nitrogen oxides $NO_x$ in the exhaust treatment system.

Also, to base the injection of reducing agent on the accurate at least one adjusted sensor signal $S_{NOx\_adj}$ also reduces the risk for formation of solid residues/deposits in the evaporation unit and/or reduction catalyst.

The embodiments of the present invention may be easily implemented essentially without addition to the system complexity. The results of an implementation of the present invention is predictable, and are easily achieved.

The determination 410 of the at least one sensor signal $S_{NOx}$ may, according to an embodiment, include averaging of the at least one sensor signal $S_{NOx}$. Such an averaging reduces the influences of noise and/or fluctuating values included in the at least one sensor signal $S_{NOx}$, which makes the method more robust and less complex. For example, according to an embodiment, the averaging of the at least one sensor signal $S_{NOx}$ may include continuously weighting the at least one measured value in order to determine/provide the at least one sensor correction value $S_{NOx\_corr}$, respectively.

There are a large number of possible ways for determining/calculating/providing averaged values based on measured values. Essentially any one or more of these ways may be used for averaging the at least one sensor signal $S_{NOx}$. For example, the at least one sensor signal $S_{NOx}$ may be low pass filtered. Also, at least one mean value for the at least one sensor signal $S_{NOx}$ may be calculated and/or at least one median value for the at least one sensor signal $S_{NOx}$ may be calculated.

When the averaging of the at least one sensor signal $S_{NOx}$ includes lowpass filtering, the used lowpass filter may, according to an embodiment have a weight in time constant $\tau$ related to at least one emission test cycle. For example, for a vehicle/system complying to a Euro V emission regulation, i.e. for a vehicle/system being tested with a Euro V test cycle, the time constant $\tau$ may have a value in the range of 3-7 seconds, or 5 seconds. The same time constant $\tau$ values may also be used for vehicles/systems complying with the Euro IV regulations. Generally, the weight in time constant $\tau$ may here be set to a value short/small/quick enough for the lowpass filtering being able to capture/include a significant part of an ammonia slip, i.e. the reducing agent passing through the at least one reduction catalyst 230, in the at least one sensor signal $S_{NOx}$. Also, the weight in time constant $\tau$ may be set to a value long/high/slow enough for the lowpass filtering being able to mitigate an influence of noise and/or fluctuations in the at least one sensor signal $S_{NOx}$.

Correspondingly, for a vehicle/system complying to the Euro VI emission regulation, i.e. for a vehicle/system being tested by a Euro VI test cycle, the time constant $\tau$ may have a value in the range of 15-25 seconds, or 20 seconds. Generally, the weight in time constant $\tau$ may here be set to a value long/big enough for capturing/including the slowly varying sensor offset value of the nitrogen oxides $NO_x$ sensor 260 in the at least one sensor signal $S_{NOx}$. By use of the long/large weight in constant $\tau$ value, the nitrogen oxides $NO_x$ sensor 260 has enough time to converge, such that the offset value may be easily detected/determined. Also, the weight in constant $\tau$ should, according to an embodiment, be set to a value short/small enough facilitating improved accuracy already within a test cycle being run.

As mentioned above, the at least one sensor signal $S_{NOx}$ should have had a value smaller than a sensor signal threshold $S_{NOx\_th}$; $S_{NOx} < S_{NOx\_th}$; during at least a predetermined convergence time period $T_{con}$ before the at least one sensor signal $S_{NOx}$ is determined 410 by use of at least one nitrogen oxides $NO_x$ sensor 260. According to an embodiment of the present invention, for example implemented in a vehicle/system complying to a Euro IV or Euro V emission regulations, i.e. for a vehicle/system being tested with a Euro V or a Euro IV test cycle, the predetermined convergence time period $T_{con}$ has a value which makes it possible to capture a slip of reducing agent from the at least one reduction catalyst 230. Thus, the predetermined convergence time period $T_{con}$ should here be small/short enough for resulting in a determination 410 when the slip of reducing agent is still in the exhaust treatment system 250, i.e. before the slip has passed the at least one nitrogen oxides $NO_x$ sensor 260. In other words, the predetermined convergence time period $T_{con}$ should have a value being so small/short that the slip of reducing agent is included in the at least one sensor signal $S_{NOx}$, i.e. is sensed by the at least one cross-sensitive nitrogen oxides $NO_x$ sensor 260.

The predetermined convergence time period $T_{con}$ may here depend on a response time of the at least one nitrogen oxides $NO_x$ sensor 260 and/or on a flow of the exhaust stream 203 around the at least one nitrogen oxides $NO_x$ sensor 260, e.g. may depend on a combination of these parameters.

As a non-limiting example for a vehicle/system complying with a Euro IV or Euro V emission regulations, the predetermined convergence time period $T_{con}$ may have a value in the range of 2-5 seconds, or 3 seconds, which makes it possible to capture the above mentioned slip of reducing agent.

According to an embodiment for example implemented in a vehicle/system complying to a Euro VI emission regulation, i.e. for a vehicle/system being tested with a Euro VI test cycle, the predetermined convergence time period $T_{con}$ may have a value related to lengths of one or more periods when the engine 101 revolves without fuel supply during normal operation of the vehicle 100 and/or during at least one emission test cycle. Generally, the predetermined convergence time period $T_{con}$ may here have a value long/large enough for ensuring that the at least one sensor signal $S_{NOx}$, i.e. the signal provided/sensed by the at least one nitrogen oxides $NO_x$ sensor 260, only includes an offset error. Thus, if the predetermined convergence time period $T_{con}$ is set long enough, the engine has revolved without fuel supply for such a long time that essentially no nitrogen oxides $NO_x$ should be output in the exhaust stream any more, and such that no nitrogen oxides $NO_x$ should be present in the sensor, which ensures that the at least one sensor signal $S_{NOx}$ only includes/indicates the offset error for the at least one nitrogen oxides $NO_x$ sensor 260, respectively.

As a non-limiting example for a vehicle/system complying to Euro VI emission regulations, the predetermined convergence time period $T_{con}$ has a value in the range of 5-15 seconds, has a value in the range of 7-12 seconds, or has a value in the range of 10 seconds.

As mentioned above, the exhaust mass flow $M'_{exh}$ should be greater than an exhaust mass flow threshold $M'_{exh\_th}$; $M'_{exh} > M'_{exh\_th}$ in order for the determination 410 of the at least one sensor signal $S_{NOx}$ as at least one sensor correction value $S_{NOx\_corr}$, respectively, to be performed. The mass flow threshold $M'_{exh\_th}$ may here, according to an embodiment, have a value high enough to ensure a flow/throughput/circulation of the exhaust stream 203 through the exhaust treatment system 250, i.e. a value high enough for preventing a still standing exhaust stream 203 in the exhaust treatment system. The mass flow threshold $M'_{exh\_th}$ may also have a value high enough to ensure a local flow/throughput/circulation of the exhaust stream 203 at and/or around the at least one nitrogen oxides $NO_x$ sensor 260, respectively. Thus, such mass flow threshold values $M'_{exh\_th}$ may for example correspond to mass flows of a running engine, i.e. to mass flows for a revolving engine. The time amounting to the predetermined convergence time period $T_{con}$ will then start running/ticking as soon as the engine is running/revolving.

According to various embodiments of the present invention, the exhaust stream mass flow $M'_{exh}$, used in combination with the mass flow threshold $M'_{exh\_th}$ as a parameter for when the at least one sensor signal $S_{NOx}$ should be determined 410, may be determined in a number of ways. For example, the exhaust stream mass flow $M'_{exh}$ may be determined based on at least one mass flow model for the exhaust treatment system 250. This model may take into account e.g. the physical form and dimension of the exhaust treatment system and/or an operation mode for the engine 201 producing the exhaust stream 203. The exhaust stream mass flow $M'_{exh}$ may also be determined based an amount of fuel and an amount of air being input into the cylinders of the engine 201 producing the exhaust stream 203. The exhaust stream mass flow $M'_{exh}$ may also be determined based on at least one measurement of the exhaust mass flow $M'_{exh}$ for the exhaust stream 203. This measurement may e.g. be performed by based on measurements of the air and the fuel being input into the engine and/or by usage of at least one mass flow sensor arranged in the exhaust treatment system, e.g. upstream of the evaporation chamber 280 and/or reduction catalyst.

As mentioned above, the at least one sensor signal $S_{NOx}$ should have had a value smaller than a sensor signal threshold $S_{NOx\_th}$; $S_{NOx}<S_{NOx\_th}$; during at least a predetermined convergence time period $T_{con}$ before the determination 410 of the at least one sensor signal $S_{NOx}$ as the at least one sensor correction value $S_{NOx\_corr}$ respectively, is to be performed. According to an embodiment for example implemented in a vehicle/system complying to a Euro VI emission regulation, i.e. for a vehicle/system being tested with a Euro VI test cycle, the sensor signal threshold $S_{NOx\_th}$ may have a value related to an accuracy and/or an offset error of the at least one nitrogen oxides $NO_x$ sensor 260, and/or to a robustness of the control of the dosage of the reducing agent. The individuals of the at least one nitrogen oxides $NO_x$ sensor 260 may have differing conversion/fall time periods, i.e. take differing times to fall when the amount and/or concentration of nitrogen oxides $NO_x$ being output from the engine are reduced to a value of essentially zero.

Therefore, it may be more reliable to initially trigger the determination 410 of the at least one sensor signal $S_{NOx}$ at smaller signal values, i.e. at smaller values for the sensor signal threshold $S_{NOx\_th}$. Hereby, a stationary value for the offset error of the at least one nitrogen oxides $NO_x$ sensor 260 may be reached more quickly, wherefore a shorter/smaller value for the predetermined convergence time period $T_{con}$ may be used. However, the sensor signal threshold $S_{NOx\_th}$ should, according to an embodiment, have a value exceeding a maximum offset error for the at least one nitrogen oxides $NO_x$ sensor 260, in order to not miss any important determinations. As a non-limiting example, the at least one nitrogen oxides $NO_x$ sensor may have a maximal offset error in the range of 12-15 ppm.

Thus, for a vehicle/system complying with Euro VI emission regulations, the sensor signal threshold $S_{NOx\_th}$ may, according to an embodiment, have a value corresponding to a nitrogen oxides $NO_x$ concentration in the range of 15-30 ppm nitrogen oxides $NO_x$, or 20 ppm nitrogen oxides $NO_x$.

According to an embodiment for example implemented in a vehicle/system complying to a Euro V emission regulation, i.e. for a vehicle/system being tested with a Euro V test cycle, the sensor signal threshold $S_{NOx\_th}$ may have a value related to a cross-sensitivity for ammonia of the at least one nitrogen oxides $NO_x$ sensor 260. During engine motoring, i.e. when the engine 101 revolves without fuel supply due to the kinetic energy driven movement of the vehicle, the temperature $T_{exh}$ of the exhaust stream 203 is decreasing.

As mentioned above, the at least one nitrogen oxides $NO_x$ sensor 260 may be cross-sensitive for nitrogen oxides $NO_x$ and ammonia $NH_3$, i.e. the value of the at least one sensor signal $S_{NOx}$ may include components originating from both nitrogen oxides $NO_x$ and ammonia $NH_3$. Therefore, the determination 410 of the at least one sensor signal $S_{NOx}$ as the at least one sensor correction value $S_{NOx\_corr}$, respectively, may be more accurate if the sensor signal threshold $S_{NOx\_th}$ is given a value related to the cross-sensitivity for ammonia of the at least one nitrogen oxides $NO_x$ sensor 260.

According to an embodiment of the present invention, the at least one sensor correction value $S_{NOx\_corr}$ being determined 410 and used for determining 420 the at least one adjusted sensor signal $S_{NOx\_adj}$, is restricted for robustness reasons. For example, the at least one adjusted sensor signal $S_{NOx\_adj}$ may be restricted to a value of ±10 ppm nitrogen oxides $NO_x$ for an exhaust treatment system 250 including at least one slip catalyst 240, e.g. for an exhaust system 250 complying with the Euro VI emission requirements. Correspondingly, for an exhaust treatment system not including at least one slip catalyst, i.e. for a system lacking at slip catalysts, the at least one adjusted sensor signal $S_{NOx\_adj}$ may be restricted to value of −10 to +200 ppm nitrogen oxides $NO_x$. By these restrictions, a difference between the at least one adjusted sensor signal $S_{NOx\_adj}$ and the at least one sensor signal $S_{NOx}$ is also restricted, which makes the herein described control 430 of the dosage more robust.

A person skilled in the art will realize that a method control of dosage of a reducing agent into an exhaust stream 203 according to the present invention may also be implemented in a computer program, which when executed in a computer will cause the computer to execute the method. The computer program usually forms a part of a computer program product 503, wherein the computer program product comprises a suitable digital non-volatile/permanent/persistent/durable storage medium on which the computer program is stored. The non-volatile/permanent/persistent/durable computer readable medium includes a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 5:
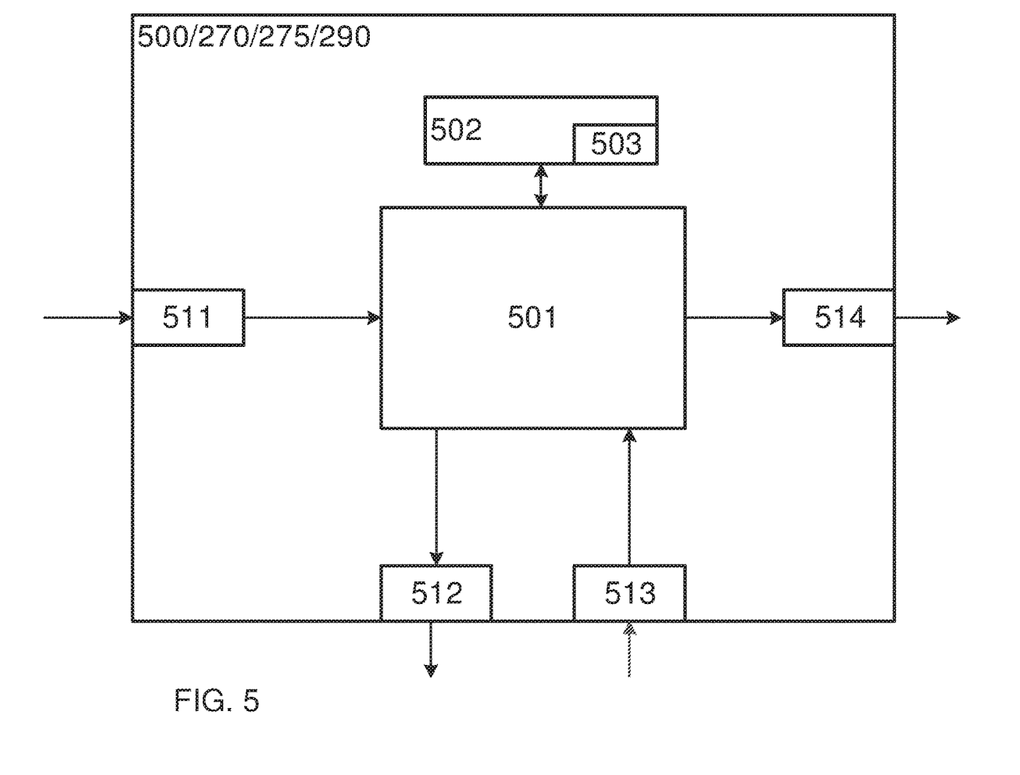
FIG. 5 shows a control device/unit/means, in which the embodiments of the present invention may be implemented.

FIG. 5 schematically shows a control device/means 500. The control device/means 500 comprises a calculation unit 501, which may include essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502, installed in the control device/means 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device/means 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system, and/or the component(s) for which the signals are intended.

Each one of the connections to the devices for receiving and sending of input and output signals may include one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles include of a communications bus system, comprising one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIGS. 1, 2, 3 and 5, which is well known to a person skilled in the art within the technology area.

As a person skilled in the art will realize, the control device/means 500 in FIG. 5 may comprise and/or illustrate one or several of the control devices/systems/means 215 and 275 in FIG. 1, the control devices/systems/means 215, 275, 270, 290 in FIG. 2, or the control devices/systems/means 215, 270, 275, 290 in FIG. 3. The control device/means 290 in FIGS. 2 and 3 are arranged for performing the embodiments of the present invention. The units/means 291, 292, 293 may for example correspond to groups of instructions, which can be in the form of programming code, that are input into, and are utilized by a processor when the units are active and/or are utilized for performing its method step, respectively.

The present invention, in the embodiment shown, may be implemented in the control device/means 500. The invention may, however, also be implemented wholly or partly in one or several other control devices, already existing in the vehicle, or in a control device dedicated to the present invention.

According to an aspect of the present invention, a system 290 arranged for control of dosage of a reducing agent into an exhaust stream 203 from an engine 101, the reducing agent being used for reduction of nitrogen oxides $NO_x$ in one or more reduction catalysts 230 of an exhaust treatment system 250 arranged for treating the exhaust stream 203 is disclosed. As described above, the exhaust stream 203 is produced by an engine 201, and is then treated by an exhaust treatment system 250 including e.g. a reduction catalyst device using a reducing agent. The reducing agent is for this reason injected into the exhaust stream 203 by the dosage device 271. The reducing agent may possibly, according to an embodiment, be evaporated in an evaporation chamber 280 when being injected into the exhaust stream 203.

The system 290 includes means 291, e.g. a determination unit 291, arranged for determining 410 at least one sensor signal $S_{NOx}$ from at least one nitrogen oxides $NO_x$ sensor 260 arranged downstream of at least one of the one or more reduction catalysts 230 as at least one sensor correction value $S_{NOx\_corr}$, respectively, if some conditions are fulfilled. These conditions include that the engine 101 revolves without fuel supply, that an exhaust mass flow $M'_{exh}$ of the exhaust stream 203 is greater than an exhaust mass flow threshold $M'_{exh\_th}$; $M'_{exh} > M'_{exh\_th}$; and that the at least one sensor signal $S_{NOx}$ has had a value smaller than a sensor signal threshold $S_{NOx\_th}$; $S_{NOx} < S_{NOx\_th}$; during at least a predetermined time period $T_{con}$.

The system 290 also includes means 292, e.g. a signal determining unit 292, arranged for determining 420 at least one adjusted sensor signal $S_{NOx\_adj}$ based on the at least one sensor signal $S_{NOx}$ and the at least one sensor correction value $S_{NOx\_corr}$, respectively.

The system 290 further includes means 293, e.g. a controlling unit 293, arranged for controlling 430 the dosage of the reducing agent based on the at least one adjusted sensor signal $S_{NOx\_adj}$.

The system 290 may be arranged/modified for performing any of the in this document described embodiments of the method according to the present invention.

The exhaust treatment system 250 shown in FIGS. 2 and 3 includes only one dosage device 271, only one reduction catalyst device 230, and only one evaporation chamber 280 for pedagogic reasons. It should, however, be noted that the present invention is not restricted to such systems, and may instead be generally applicable in any exhaust treatment system including one or more dosage devices, one or more reduction catalyst devices, and possibly also one or more evaporation chambers. For example, the present invention is especially applicable on systems including a first dosage device, possibly a first evaporation chamber, a first reduction catalyst device, a second dosage device, possibly a second evaporation chamber and a second reduction catalyst device. Each one of the first and second reduction catalyst devices may include at least one SCR-catalyst, at least one ammonia slip catalyst ASC, and/or at least one multifunctional slip-catalyst SC. The multifunctional slip catalyst SC may be arranged primarily for reduction of nitrogen oxides $NO_x$, and secondarily for oxidation of reducing agent in the exhaust stream. The multifunctional slip catalyst SC may also be arranged for performing at least some of the functions normally performed by a DOC, e.g. oxidation of hydrocarbons $C_xH_y$ (also referred to as HC) and carbon monoxide CO in the exhaust stream 203 into carbon dioxide $CO_2$ and water $H_2O$ and/or oxidation of nitrogen monoxides NO occurring in the exhaust stream into nitrogen dioxide $NO_2$. As mentioned above, the embodiments of the present invention may e.g. be implemented in vehicles/systems complying with one or more of the Euro IV, Euro V and Euro VI emission regulations.

The present invention is also related to a vehicle 100, such as e.g. a truck, a bus or a car, including the herein described system 290 for arranged for controlling a dosage of reducing agent.

The inventive method, and embodiments thereof, as described above, may at least in part be performed with/using/by at least one device. The inventive method, and embodiments thereof, as described above, may be performed at least in part with/using/by at least one device that is suitable and/or adapted for performing at least parts of the inventive method and/or embodiments thereof. A device that is suitable and/or adapted for performing at least parts of the inventive method and/or embodiments thereof may be one, or several, of a control unit, an electronic control unit (ECU), an electronic circuit, a computer, a computing unit and/or a processing unit.

With reference to the above, the inventive method, and embodiments thereof, as described above, may be referred to as an, at least in part, computerized method. The method being, at least in part, computerized meaning that it is performed at least in part with/using/by the at least one device that is suitable and/or adapted for performing at least parts of the inventive method and/or embodiments thereof.

With reference to the above, the inventive method, and embodiments thereof, as described above, may be referred to as an, at least in part, automated method. The method being, at least in part, automated meaning that it is performed with/using/by the at least one device that is suitable and/or adapted for performing at least parts of the inventive method and/or embodiments thereof.

The present invention is not limited to the embodiments of the invention described above, but relates to and comprises all embodiments within the scope of the enclosed independent claims.

The invention claimed is:

1. A method for control of dosage of a reducing agent into an exhaust stream from an engine, said reducing agent being used for reduction of nitrogen oxides $NO_x$ in one or more reduction catalysts of an exhaust treatment system arranged for treating said exhaust stream, said method comprising:
determining at least one sensor signal $S_{NOx}$ from at least one nitrogen oxides $NO_x$ sensor arranged downstream of at least one of said one or more reduction catalysts as at least one sensor correction value $S_{NOx\_corr}$, respectively, if:
said engine rotates without fuel supply;
an exhaust mass flow $M'_{exh}$ is greater than an exhaust mass flow threshold $M'_{exh\_th}$; $M'_{exh}>M'_{exh\_th}$; and
said at least one sensor signal $S_{NOx}$ has had a value smaller than a sensor signal threshold $S_{NOx\_th}$; $S_{NOx}<S_{NOx\_th}$; during at least a predetermined time period $T_{con}$;
determining at least one adjusted sensor signal $S_{NOx\_adj}$ based on said at least one sensor signal $S_{NOx}$ and said at least one sensor correction value $S_{NOx\_corr}$, respectively; and
controlling said dosage of said reducing agent based on said at least one adjusted sensor signal $S_{NOx\_adj}$.

2. The method as claimed in claim 1, wherein the determination of said at least one sensor signal $S_{NOx}$ includes averaging of said at least one sensor signal $S_{NOx}$.

3. The method as claimed in claim 2, wherein said averaging comprises one or more in the group of:
low pass filtering of said at least one sensor signal $S_{NOx}$;
calculation of at least one mean value for said at least one sensor signal $S_{NOx}$;
calculation of at least one moving average value for said at least one sensor signal $S_{NOx}$; and
calculation of at least one median value for said at least one sensor signal $S_{NOx}$.

4. The method as claimed in claim 2, wherein said averaging is performed using a lowpass filter, said lowpass filter having a time constant $\tau$ related to at least one emission test cycle, said time constant $\tau$ having a value in the range of one in the group of:
3-7 seconds;
5 seconds;
115-25 seconds; and
120 seconds.

5. The method as claimed in claim 1, wherein said predetermined time period $T_{con}$ has a value making it possible to capture a slip of reducing agent from said at least one reduction catalyst.

6. The method as claimed in claim 5, wherein said predetermined time period $T_{con}$ has a value in the range of 2-5 seconds, or has a value of 3 seconds.

7. The method as claimed in claim 1, wherein said predetermined time period $T_{con}$ has a value related to lengths of one or more periods when said engine rotates without fuel supply during normal operation of said vehicle and/or during at least one emission test cycle.

8. The method as claimed in claim 7, wherein said predetermined time period $T_{con}$ has a value in the range of one of: 5-15 seconds, 7-12 seconds, or 10 seconds.

9. The method as claimed in claim 1, wherein said mass flow threshold $M_{exh\_th}$ has a value high enough to ensure one or more in the group of:
a flow of said exhaust stream through said exhaust treatment system; and
a flow of said exhaust stream around said at least one nitrogen oxides $NO_x$ sensor.

10. The method as claimed in claim 1, wherein said sensor signal threshold $S_{NOx\_th}$ has a value related to one or more in the group of:
an accuracy of said at least one nitrogen oxides $NO_x$ sensor;
an offset error for said at least one nitrogen oxides $NO_x$ sensor; and
a robustness of said control of said dosage of said reducing agent.

11. The method as claimed in claim 10, wherein said sensor signal threshold $S_{NOx\_th}$ has a value corresponding to a nitrogen oxides $NO_x$ concentration in the range of one of: 15-30 ppm nitrogen oxides $NO_x$, or 20 ppm nitrogen oxides $NO_x$.

12. The method as claimed in claim 1, wherein said sensor signal threshold $S_{NOx\_th}$ has a value related to a cross-sensitivity for ammonia of said at least one nitrogen oxides $NO_x$ sensor.

13. A computer program product comprising computer program code stored on a non-transitory computer-readable medium, said computer program product used for control of dosage of a reducing agent into an exhaust stream from an engine, said reducing agent being used for reduction of nitrogen oxides $NO_x$ in one or more reduction catalysts of an exhaust treatment system arranged for treating said exhaust stream, said computer program code comprising computer instructions to cause one or more control devices to perform the following operations:
determining at least one sensor signal $S_{NOx}$ from at least one nitrogen oxides $NO_x$ sensor arranged downstream of at least one of said one or more reduction catalysts as at least one sensor correction value $S_{NOx\_corr}$, respectively, if:
said engine rotates without fuel supply;
an exhaust mass flow $M'_{exh}$ is greater than an exhaust mass flow threshold $M'_{exh\_th}$; $M'_{exh}>M'_{exh\_th}$; and
said at least one sensor signal $S_{NOx}$ has had a value smaller than a sensor signal threshold $S_{NOx\_th}$; $S_{NOx}<S_{NOx\_th}$; during at least a predetermined time period $T_{con}$;
determining at least one adjusted sensor signal $S_{NOx\_adj}$ based on said at least one sensor signal $S_{NOx}$ and said at least one sensor correction value $S_{NOx\_corr}$, respectively; and
controlling said dosage of said reducing agent based on said at least one adjusted sensor signal $S_{NOx\_adj}$.

14. A system arranged for control of dosage of a reducing agent into an exhaust stream from an engine, said reducing agent being used for reduction of nitrogen oxides $NO_x$ in one or more reduction catalysts of an exhaust treatment system arranged for treating said exhaust stream, said system comprising:

means arranged for determining at least one sensor signal $S_{NOx}$ from at least one nitrogen oxides $NO_x$ sensor arranged downstream of at least one of said one or more reduction catalysts as at least one sensor correction value $S_{NOx\_corr}$, respectively, if:

said engine rotates without fuel supply;

an exhaust mass flow $M'_{exh}$ is greater than an exhaust mass flow threshold $M'_{exh\_th}$; $M'_{exh} > M'_{exh\_th}$; and     said at least one sensor signal $S_{NOx}$ has had a value smaller than a sensor signal threshold $S_{NOx\_th}$; $S_{NOx} < S_{NOx\_th}$; during at least a predetermined time period $T_{con}$;

means arranged for determining at least one adjusted sensor signal $S_{NOx\_adj}$ based on said at least one sensor signal $S_{NOx}$ and said at least one sensor correction value $S_{NOx\_corr}$, respectively; and     means arranged for controlling said dosage of said reducing agent based on said at least one adjusted sensor signal $S_{NOx\_adj}$.

\* \* \* \* \*

UNITED STATES PATENT AND TRADEMARK OFFICE
CERTIFICATE OF CORRECTION

| | |
|---|---|
| PATENT NO. | : 11,125,132 B2 |
| APPLICATION NO. | : 17/048121 |
| DATED | : September 21, 2021 |
| INVENTOR(S) | : Christer Lundberg et al. |

It is certified that error appears in the above-identified patent and that said Letters Patent is hereby corrected as shown below:

In the Claims

Column 19, Claim 4, change Lines 62 through 63 to read:
"15-25 seconds; and 20 seconds."

Signed and Sealed this
Fifteenth Day of November, 2022

Katherine Kelly Vidal
*Director of the United States Patent and Trademark Office*